3,143,530
LINEAR POLYCARBONAMIDES FROM PIPERA-
ZINES AND FLUORENE DICARBOXYLIC ACIDS
Anthony A. D'Onofrio, Martinsville, N.J., assignor to Union Carbide Corporation, a corporation of New York
No Drawing. Filed Apr. 19, 1961, Ser. No. 104,000
15 Claims. (Cl. 260—78)

This invention relates to linear, amorphous thermoplastic polyamides and more particularly to linear, amorphous polyamides prepared from 9,9-fluorenedicarboxylic acids or their amide-forming derivatives and a piperazine compound. This invention also relates to a process for preparing said linear, amorphous thermoplastic polyamides.

The linear, amorphous polyamides or more specifically the polycarbonamides of this invention have a reduced viscosity in the range of from about 0.2 to about 5 and contain a plurality of recurring structural units of the general formula:

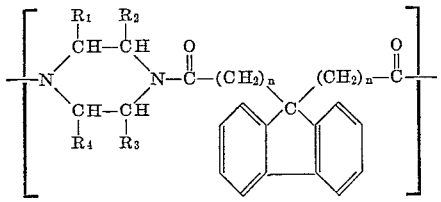

Formula I wherein $R_1$, $R_2$, $R_3$ and $R_4$, which can be the same or different, represent hydrogen, alkyl, aryl, alkaryl, or aralkyl, and $n$ represents a positive integer of from 1 to 3 inclusive.

Reduced viscosity values noted herein were determined by forming a solution having a concentration of 0.2 gram of the linear, amorphous polyamide per 100 milliliters of a mixture of 60 percent by weight of phenol and 40 percent by weight tetrachloroethane. The time of flow in a viscosimeter was determined for both the solvent (60–40 percent by weight phenol and tetrachloroethane) and the polyamide solution. Reduced viscosity was then calculated using the equation:

$$R.V. = \frac{T_1 - T_2}{T_2 C}$$

where $T_1$ = the efflux time for the polyamide solution
$T_2$ = the efflux time for the solvent
$C$ = concentration of the solution in grams of polyamide per 100 milliliters of solvent.

As stated $R_1$, $R_2$, $R_3$ and $R_4$ in the general Formula I previously noted can be hydrogen; alkyl, aryl, alkaryl, or aralkyl radicals. Exemplary of such radicals are methyl, ethyl, propyl, butyl, amyl, hexyl, 2-ethylhexyl, decyl, dodecyl, phenyl, naphthyl, o-methylphenyl, p-ethylphenyl, p-propylphenyl, o-propylphenyl, o-butylphenyl, p-dodecylphenyl, p-(2-ethylhexyl)phenyl, phenylethyl, 2-phenylpropyl, 1-phenylpropyl, 1-naphthylbutyl, 2-naphthylbutyl, 1-phenylbutyl, 2-phenylamyl, 1-phenyl-2-ethylhexyl, 1-naphthyldecyl and the like.

As noted, $n$ can be 1, 2, or 3, and thus $-(CH_2)_n-$ in the general Formula I can represent a methylene, a dimethylene or a trimethylene radical.

Particularly desirable linear, amorphous polyamides within the scope of this invention are those having a plurality of recurring structural units of the general Formula I previously given wherein $R_1$, $R_2$, $R_3$ and $R_4$ are hydrogen or alkyl radicals, said alkyl radicals preferably containing a maximum of 12 carbon atoms, and wherein $n$ is 2.

Analysis of the polyamides of this invention in accordance with well known methods, such as by study of their respective X-ray diffraction patterns, reveals no measurable amount of crystallinity. As compared to currently known crystalline polyamides they have lower flow points. Consequently, the polyamides of this invention are much more readily fabricated into attractive films, molded articles and the like than the presently known crystalline polyamides. The method for determining the flow point of the polyamides is described in Campbell and Sorenson "Preparative Methods of Polymer Chemistry," Interscience Publishers (1961), at pages 49 through 51.

The polyamides of this invention, as compared to currently known amorphous polyamides, have significantly better tensile strength, tensile impact strength, flexural strength, modulus of elasticity and higher softening points.

Furthermore, film produced from the linear, amorphous polyamides has excellent gloss and excellent transparency which makes such film particularly desirable for packaging uses. Film made from these polyamides can also be biaxially oriented.

In addition, the linear, amorphous polyamides of this invention have excellent thermal stability, as compared to hitherto known amorphous polyamides, as evidenced by higher $T_4$ temperatures. As a result these polyamides are well adapted for uses, such as high temperature electrical insulation, in which all known amorphous polyamides are unsatisfactory. The $T_4$ temperature referred to above is that temperature at which the 1 percent secant modulus of the polyamide falls to 10,000 pounds per square inch or lower. Determination of this temperature is readily accomplished on an Instron Tensile Tester and furnishes an excellent indication of the practical upper use temperature of the polyamide. $T_4$ temperatures of the polyamides of this invention are about 130° centigrade or higher. No known amorphous polyamides have $T_4$ temperatures in this range. The significance of the $T_4$ temperature and a description of methods for determining the same is found in Brown, Textile Research Journal, vol. 25, No. 11, pages 891 through 901 (November 1955) which is hereby incorporated herein by reference thereto.

Polyamides of this invention can furthermore be fabricated (that is, extruded, molded, etc.) over a broad temperature range, generally between about 275° and about 325° centigrade. In comparison, known polyamides can only be fabricated in very narrow temperature ranges, with permissible variations of no more than 10° or 15° centigrade. Thus, the polyamides of this invention obviously will offer great processing advantages to fabricators because of the less rigid control of process conditions which inheres in broader fabrication temperature ranges.

The linear, amorphous polyamides of this invention can be prepared by polymerizing a compound having the general formula:

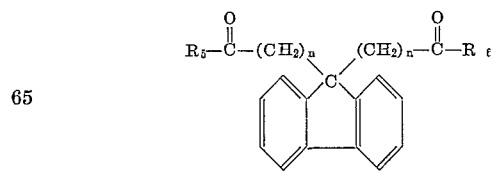

Formula II wherein $n$ is as previously defined and $R_5$ and $R_6$, which can be the same or different, are hydroxyl, halogen, alkoxy or phenoxy radicals; or an anhydride of an acid having the Formula II above where $R_5$ and $R_6$ both are hydroxyl; with a piperazine compound having the general formula:

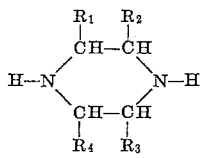

Formula III wherein $R_1$, $R_2$, $R_3$ and $R_4$ are as previously defined.

Illustrative of such piperazine compounds are: piperazine, 2-methylpiperazine, 2,5-dimethylpiperazine, 2-phenylpiperazine, 2 - (o - methylphenyl) - piperazine, 2-(p - ethylphenyl) - piperazine, 1 - phenylethylpiperazine, 2,3,5 - trimethylpiperazine, 2,3,5,6 - tetraethylpiperazine, and other like compounds.

Specific acids and anhydrides which are suitable for the preparation of the polyamides of this invention are 9,9 - fluorenediacetic acid, 9,9 - fluorenedi - n - propionic acid, 9,9 - fluorenedi - n - butanoic acid, the anhydride of 9,9 - fluorenediacetic acid, the anhydride of 9,9 - fluorenedi - n - propionic acid, and the anhydride of 9,9-fluorenedi-n-butanoic acid.

Exemplary of compounds falling within the scope of Formula II wherein either or both of $R_5$ and $R_6$ are halogen, that is, chlorine, bromine, iodine or fluorine, are the mono-chloride, mono-fluoride, mono-bromide and mono-iodide of 9,9-fluorenediacetic acid, of 9,9-fluorenedi-n-propionic acid, and of 9,9-fluorenedi-n-butanoic acid; the dichloride, difluoride, dibromide, and the diiodide of the above named acids; and the mixed dihalides of said acids, that is, those dihalide compounds wherein $R_5$ and $R_6$ are different halogens.

Illustrative of compounds included within the scope of Formula II above, wherein either one or both of $R_5$ and $R_6$ are alkoxy or phenoxy, which can be reacted to produce the polyamides of this invention are those where $R_5$ and/or $R_6$ are, for example, phenoxy, p-phenylphenoxy, p-methylphenoxy, chlorophenoxy, dichlorophenoxy, methoxy, ethoxy, n-propoxy, isopropoxy, n-butoxy, isobutoxy, sec-butoxy, n-amoxy; n-hexoxy, 2-ethylhexoxy, n-octoxy, n-nonoxy, n-decoxy, n-dodecoxy, n-ocetadecoxy and the like. Exemplary of such compounds are monoesters such as the monophenyl, monochlorophenyl, mono(4-methylphenyl), monomethyl, monoethyl, mono-n-propyl, mono-n-hexyl, mono-n-dodecyl, and nono-n-octadecyl esters of 9,9 - fluorenediacetic acid, of 9,9-fluoroenedi-n-proprionic acid and of 9,9-fluorenedi - n - butanoic acid; diesters, such as the diphenyl, dimethyl, diethyl, di-n-propyl, di-n-butyl, di-n-dodecyl, and the di-n-octadecyl esters of the above named acids, as well as the mixed diesters such as the methyl phenyl, methyl ethyl, methyl n-propyl, ethyl phenyl, ethyl n-hexyl, and methyl n-dodecyl esters of 9,9-fluorenediacetic, 9,9-fluorenedi - n - propionic and 9,9-fluorenedi - n - butanoic acids. Preferred esters are the monoethyl, dimethyl, monophenyl and diphenyl esters.

Other suitable compounds included within the general Formula II above which can be used to produce the linear, amorphous thermoplastic polyamides of this invention are the mixed ester-halides of 9,9-fluorenedicarboxylic acids, that is, those compounds illustrated by the general Formula II wherein $R_5$ is a halogen, including fluorine, chlorine, bromine or iodine, and $R_6$ is a phenoxy or alkoxy radical including those alkoxy radicals listed immediately above. An illustrative example of these compounds is the monomethyl ester of the monoacid chloride of 9,9-fluorendipropionic acid.

The polymerization or condensation reaction which results in the preparation of linear, amorphous polyamides in accordance with the present invention can be illustrated by the following equation wherein the starting materials are represented by general formulas:

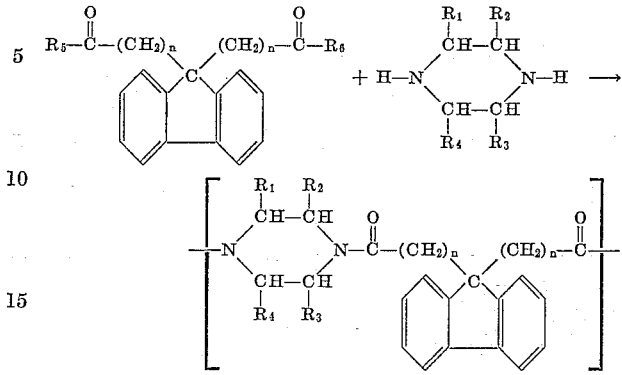

wherein $R_1$, $R_2$, $R_3$, $R_4$, $R_5$, $R_6$, and $n$ are as previously defined.

The polymerization reaction can be conducted by using various amounts of the reactants. Generally the piperazine compound is used in amounts of from at least about 90 percent of stoichiometric to about 100 percent or more in excess of stoichiometric. Usually however, it is preferred to use about stoichiometric amounts. In determining stoichiometric amounts one amine

group is considered to react with one carbonyl

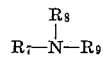

group.

In those instances where there is used a compound falling within the scope of Formula II wherein one or both of $R_5$ and $R_6$ are halogen, and when the piperazine compound is used in an amount less than about 100 percent in excess of the stoichiometric amount, it is customary to have present in the reaction mixture a hydrogen halide acceptor, that is, a compound which will react with and neutralize the free hydrogen halide in the reaction mixture. Among suitable hydrogen halide acceptors which can be noted are the water-soluble inorganic bases, as for example the alkali metal hydroxides, carbonates or bicarbonates such as sodium, potassium or lithium hydroxide and sodium, potassion or lithium carbonates or bicarbonates. Also suitable are organic bases such as tertiary amines including for example trimethylamine, triethylamine, tri-n-propylamine, tri-n-butylamine, tri-n-dodecylamine, tri-n-docosylamine, tri-(2-phenylethyl)amine, tribenzylamine, dimethyl-n-propylamine, diethyl-n-propylamine, methylethyl-n-propylamine, pyridine, methylpyridine and the like. Particularly effective tertiary amines are those having the general formula $$R_7-N(R_8)-R_9$$

wherein $R_7$, $R_8$ and $R_9$, which can be the same or different, are either alkyl or aralkyl radicals, each having a maximum of twelve (12) carbon atoms.

The amount of hydrogen halide acceptor used will depend upon the amount of the piperazine compound reactant in the polymerization reaction mixture. When there is sufficient excess of the piperazine compound to react with and neutralize all of the hydrogen halide by-product liberated no additional hydrogen halide acceptor need be used. As stated previously, the piperazine compound is usually present in about stoichiometric amounts, and it is thus desirable to add sufficient amounts of hydrogen halide acceptor to at least neutralize substantially all of the hydrogen halide by-product. Preferably the amounts of added hydrogen halide acceptor are within the range of from about one (1) to about five (5) times the amount equivalent to the liberated hydrogen halide by-product.

If desired the polymerization reaction can be conducted in contact with an inert, liquid diluent. Such diluent, when used, must be non-reactive with the starting materials and with the polyamide product. The inert, liquid diluent may be a solvent for the starting materials, for the polyamide product, or both; as desired. Thus it is possible to conduct the polymerization reaction using an inert, liquid diluent which is a solvent for the starting materials and a nonsolvent for the polyamide product; or to conduct the polymerization reaction using an inert, liquid diluent which is a solvent for the polyamide only. Suitable inert liquid diluents which can be used include water; monohydric phenols, such as, for example, phenol, m-cresol, o-cresol, p-cresol, xylenol and the like; aromatic hydrocarbons such as benzene, toluene, xylene and the like; chlorinated aromatic hydrocarbons such as chlorobenzene and the like; aliphatic hydrocarbons such as n-hexane, n-heptane and the like; halogenated aliphatic hydrocarbons such as dichloromethane, tetrachloroethane and the like; ethers such as diethyl ether of ethylene glycol, diethyl ether of 1,3-propylene glycol, dioxane and the like. Other suitable diluents include acetone, alcohols, high-boiling petroleum hydrocarbons and the like. Suitable diluents to be used for any specific mode of operation will be obvious to those skilled in the art.

The polymerization reaction is generally conducted at atmospheric pressure, although superatmospheric or subatmospheric pressures can be used if so desired.

Temperatures employed for the polymerization reaction can also vary over a wide range, generally from about $-10°$ centigrade to about 325° centigrade. The specific temperature range chosen will vary in accordance with the particular reactants and reaction pressures and with the specific mode of operation chosen, as more fully defined below.

When operating at temperatures between about 150° centigrade and about 325° centigrade, it is possible that in some instances the starting materials or the polyamide products may be oxidized. In such cases it is usually desirable and generally preferable to provide in the reaction zone an inert dry gas atmosphere. Suitable inert gases for this purpose include for example nitrogen, helium, argon, hydrogen and the like. It is generally preferred to use nitrogen or argon.

The polymerization reaction can be conducted with or without the addition of a catalyst, as desired. Suitable catalysts that can be used include strong acids such as phosphoric acid, sulfuric acid and the like as well as alkaline materials such as alkali metal or alkali earth metal oxides, hydroxides or carbonates such as sodium hydroxide, sodium carbonate, calcium oxide, barium hydroxide, potassium carbonate and the like.

It may be desirable in some instances to limit that average molecular weight (that is, the degree of polymerization) of the polyamide product. This can be accomplished by adding a chaim terminator to the reaction mixture when the polyamide has attained the desired reduced viscosity. Suitable chain terminators include monocarboxylic acids of the general formula RCOOH or monoamines of the general formula $RNH_2$ wherein R in each instance represents a saturated aliphatic or cycloaliphatic radical having a maximum of 12 carbon atoms. Exemplary of such radicals are straight or branched chain alkyl or cycloalkyl radicals such as methyl, ethyl, n-propyl, isopropyl, n-butyl, sec-butyl, n-amyl, 2-ethylhexyl, n-decyl, n-dodecyl, cyclohexyl and the like. Specific chain terminators include acetic acid, propionic acid, 2-ethylhexanoic acid, n-decanoic acid, methylamine, ethylamine, 2-ethylhexylamine, cyclohexylamine and other like compounds.

Recovery of the linear amorphous polyamide product from the reaction mixture is readily accomplished by conventional methods. For example, when a diluent is used which is a solvent for the starting materials and a nonsolvent for the polyamide product, the polyamide can be recovered as a precipitate from the reaction mixture. Similarly, when the polymerization reaction is conducted with the use of a diluent which is a solvent for the polyamide product, the poylamide may be recovered by adding to the reaction product mass a non-solvent for the polyamide thereby precipitating the polyamide, which is then recovered by conventional filtration, centrifugation or decantation methods. When no diluent is used the polyamide can be recovered simply by heating the reacted mixture under a partial vacuum, generally at about 0.01 to about 100 millimeters of mercury, absolute; at a temperature and for a time sufficient to volatilize any by-products and any unreacted starting materials. When using this latter recovery procedure the temperature is usually maintained below about 325° centigrade.

Various specific modes of operation can be used in conducting the polymerization reaction of the invention. One mode involves simply mixing the reactants in about stoichiometric quantities and heating the resulting mixture to temperatures sufficient to effect polymerization of the reactants. Such temperatures are generally within the range of from about 100° centigrade to about 325° centigrade, and preferably between about 125° centigrade and about 300° centigrade.

In another specific mode of operation the salt of the two reactants is prepared and then heated to fusion temperatures, generally between about 150° centigrade and about 325° centigrade and preferably between about 175° centigrade and about 300° centigrade, for a sufficient period of time to effect the desired degree of polymerization. The salt is readily prepared by adding an alcoholic solution of 9,9-fluorenedicarboxylic acid starting material of the general Formula II above to an alcoholic solution containing approximately stoichiometric amounts of a piperazine compound of the general Formula III above, and filtering out the salt which precipitates. The solutions of 9,9-fluorenedicarboxylic acid compound and of piperazine compound can be formed through the use of such alcohols as methanol, ethanol, butanol, isopropanol and the like. The salt of 9,9-fluorenedicarboxylic acid and the piperazine compound can be used as recovered or can be washed and dried before use if desired.

More detailed descriptions of processes which can be used in preparing the polyamides of this invention are found in Carothers, U.S. Patent 2,130,948, issued September 20, 1938; Hanford, U.S. Patent 2,281,576, issued May 5, 1942; and Magat, U.S. Patent 2,831,834, issued April 22, 1958; each of which is incorporated herein by reference thereto.

The 9,9-fluorenedicarboxylic acid starting materials used in this invention can be prepared by methods known to the art. One method of preparing 9,9-fluorenedipropionic acid is by cyanoethylation of fluorene followed by saponification and acidification of the cyanoethyl derivative. This method is more fully described in Bruson, U.S. Patent 2,280,058, issued April 21, 1942; which is incorporated herein by reference thereto.

The compound 9,9-fluorenediacetic acid can be prepared by cyanomethylation of fluorene through reaction with formaldehyde and hydrogen cyanide, followed by saponification and acidification as described in Bruson, U.S. Patent 2,280,058, mentioned above.

There are several methods of preparing 9,9-fluorenedibutanoic acid. The simplest method is by direct oxidation of 9,9-bis-(4-hydroxybutyl)-fluorene. The 9,9-fluorenedibutanol is described in Chemical Abstracts, vol. 44, page 5854 (1950). Another method of preparing 9,9-fluorenedibutanoic acid is by reacting 1 mole fluorene with 2 moles allyl bromide ($CH_2=CHCH_2BR$) to produce 9,9-bis-(3-bromopropyl) fluorene, which can then be reacted with an alkali metal cyanide, such as sodium cyanide, to produce 9,9-bis(3-cyanopropyl) fluorene. The cyanopropyl derivative can then be saponified and acidified as described in Bruson, U.S. Patent 2,280,058 to produce 9,9-fluorenedibutanoic acid.

The following specific examples will further illustrate this invention. These examples are merely illustrative and should not be construed as limiting the invention other than as defined in the appended claims.

EXAMPLE 1

*Polymerization of 9,9-Fluorenedipropionic Acid and Piperazine*

A solution of 8.6 grams of piperazine in 78 grams of absolute ethanol was added, at room temperature, to a solution of 31.0 grams of 9,9-fluorenedipropionic acid in 100 grams of absolute ethanol. The acid and the piperazine were thus present in the mixed solutions in about stoichiometric proportions. From this mixture there was precipitated about 36 grams of piperazonium-9,9-fluorenedipropionate having a melting point in the range of from about 214° to 220° centigrade. The precipitated salt was filtered out, washed with dry ethanol and dried.

About 5 grams of the piperazonium-9,9-fluorenedipropionate were placed in a closed, glass polymerization vessel equipped with an inlet for purified nitrogen and a short distillation column. The salt was heated at a temperature of about 225° centigrade for about two hours while nitrogen was bubbled therethrough. Water, produced as a by-product of the reaction, was distilled off. After this initial two hour period, the pressure in the reaction vessel was reduced to within the range of from about 0.05 to about 1.0 millimeters of mercury, absolute; while maintaining the temperature between about 275° and about 290° centigrade. Under these conditions the viscosity of the reaction melt rapidly increased and after about 3 hours (making a total reaction time of 5 hours) became so viscous that nitrogen could no longer be easily bubbled therethrough. At this point heating was discontinued, the vacuum was released, and the glass reaction vessel and contents therein allowed to slowly cool to room temperature. The polyamide product was recovered by breaking the glass reaction vessel and removing the product. When other types of reaction vessels are used the polyamide can be recovered by extrusion under pressure through a valve at the bottom of the vessel.

The resulting poly(piperazine-9,9-fluorenedipropionamide) was subjected to an X-ray diffraction pattern analysis and was found to contain no measurable amount of crystallinity. This polyamide had a reduced viscosity at 25° centrigrade of 0.71 and a flow point temperature in the range of from about 230° to about 240° centigrade. The T₄ temperature of this polyamide was 151° centigrade.

Infra-red anaylsis of the amorphous thermoplastic polyamide showed that it had recurring units of the formula:

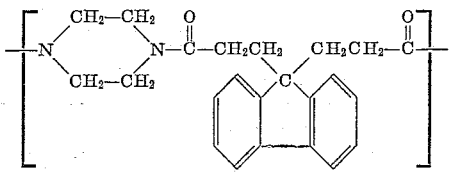

This linear amorphous polyamide was readily soluble in dimethyl formamide at room temperature. Solutions so prepared were spread on a glass surface, using a Boston-Bradley Drawdown Bar, and the resultant film was dried at room temperature for several hours. The film was then further dried at temperature gradually increased from about 60° centigrade to about 100° centigrade over a period of several hours. Final drying was performed under vacuum at about 100° Centigrade for about one to about two hours to insure complete volatilization of the dimethyl formamide solvent. The polyamide film thus produced could be readily stripped from the glass surface upon which it had been spread. In this manner films ranging from 0.001 inch (1 mil) to 0.010 inch (10 mils) in thickness were prepared. Each of these films was transparent, colorless, flexible and tough. They were thus particularly suitable for use as packaging materials.

Molded plaques of the poly(piperazine-9,9-fluorenedipropionamide) were prepared by compression molding between two highly polished platens in a steam heated hydraulic press at a temperature of about 260° centigrade and a pressure of about 2000 pounds per square inch. The plaques so prepared were about 0.075 inch (75 mils) thick. These plaques were found to be rigid and tough, and samples which were die cut therefrom were dimensionally stable in boiling water.

EXAMPLE 2

*Polymerization of 9,9-Fluorenedipropionic Acid and 2,5-Dimethylpiperazine*

Using the same procedures as described in Example 1 above, solutions containing about stoichiometric proportions of 9,9-fluorenedipropionic acid and 2,5-dimethylpipeazine were reacted to prepare 2,5-dimethylpiperazonium-9,9-fluorenediproprionate, having a melting point in the range of from about 211° to about 216° centigrade, which was polymerized to produce poly(2,5-dimethylpiperazine-9,9-fluorenedipropionamide). Analysis of this linear, amorphous thermoplastic polyamide showed that it had recurring units of the formula:

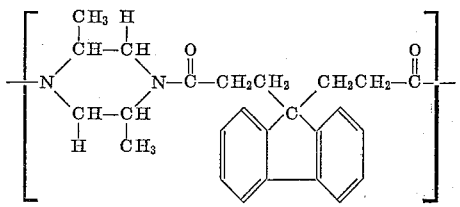

This linear, amorphous polyamide when subjected to an X-ray diffraction pattern analysis showed no measurable amount of crystallinity. It had a reduced viscosity at 25° centigrade of 0.62, and a flow point temperature in the range of from about 235° to about 245° centigrade. The T₄ temperature of this polyamide was between about 130° and about 133° centigrade.

By using the procedures described in Examples 1 and 2 one can also prepare other linear, amorphous thermoplastic polyamides such as poly(piperazine-9,9-fluorenediacetamide), poly(piperazine-9,9-fluorenedibutyramide), poly(2,3,5 - trimethylpiperazine - 9,9 - fluorenedipropionamide), poly(2,3,5,6-tetraethylpiperazine-9,9-fluorenedipropionamide) and the like.

What is claimed is:

1. Linear, amorphous thermoplastic polycarbonamides having a plurality of recurring structural units of the general formula:

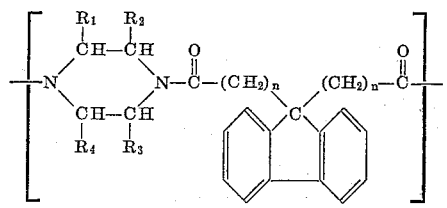

wherein $R_1$, $R_2$, $R_3$ and $R_4$ are selected from members of the group consisting of hydrogen, alkyl, aryl, alkaryl, and aralkyl radicals having a maximum of 20 carbon atoms, and $n$ is a positive integer of from 1 to 3, inclusive.

2. Linear, amorphous thermoplastic polycarbonamides as defined in claim 1 wherein $R_1$, $R_2$, $R_3$ and $R_4$ are alkyl each containing a maximum of 12 carbon atoms.

3. Linear, amorphous thermoplastic polycarbonamides as defined in claim 1 wherein $n$ is 2.

4. Linear, amorphous thermoplastic polycarbonamides as defined in claim 1 wherein $R_1$, $R_2$, $R_3$ and $R_4$ are hydrogen.

5. A linear, amorphous thermoplastic polycarbonamide as defined in claim 1 wherein $R_1$, $R_2$, $R_3$ and $R_4$ are hydrogen, and $n$ is 2.

6. A linear, amorphous thermoplastic polycarbonamide as defined in claim 1 wherein $R_1$ and $R_3$ are methyl, $R_2$ and $R_4$ are hydrogen, and $n$ is 2.

7. Process for the preparation of linear, amorhous thermoplastic polycarbonamides which comprises condensing a starting material selected from the group consisting of (a) compounds having the general formula:

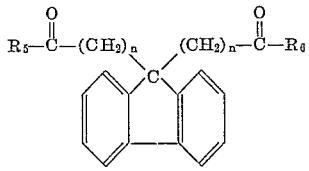

wherein $R_5$ and $R_6$ are selected from the group consisting of hydroxyl, halogen, alkoxy having a maximum of 18 carbon atoms and phenoxy radicals and $n$ is a positive integer of from 1 to 3, inclusive; and (b) anhydrides of an acid having the general formula above where $R_5$ and $R_6$ are hydroxyl; with a piperazine compound having the general formula:

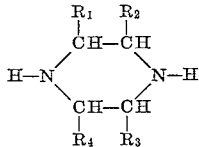

wherein $R_1$, $R_2$, $R_3$ and $R_4$ are selected from the group consisting of hydrogen, alkyl, aryl, alkaryl, and aralkyl radicals having a maximum of 20 carbon atoms, for a period of time sufficient to produce a thermoplastic polyamide.

8. Process for the preparation of linear, amorphous thermoplastic polycarbonamides as described in claim 7, wherein the piperazine compound is piperazine.

9. Process as defined in claim 8 wherein $n$ is 2.

10. Process for the preparation of linear, amorphous thermoplastic polycarbonamides as described in claim 7, wherein the piperazine compound is 2,5-dimethylpiperazine.

11. Process as defined in claim 10 wherein $n$ is 2.

12. Process as defined in claim 7 wherein the reaction is conducted at temperatures in the range of from about $-10°$ centigrade to about $325°$ centigrade.

13. Process as defined in claim 12 wherein the piperazine compound is present in amounts of from about 90 percent of stoichiometric to about 100 percent in excess of stoichiometric.

14. Process as defined in claim 7 wherein the reaction is conducted at temperatures in the range of from about $150°$ centigrade to about $300°$ centigrade.

15. Process as defined in claim 14 wherein the piperazine compound is present in amounts equal to about stoichiometric amounts.

References Cited in the file of this patent
UNITED STATES PATENTS

| | | |
|---|---|---|
| 2,130,948 | Carothers | Sept. 20, 1938 |
| 2,731,447 | Gresham et al. | Jan. 17, 1956 |
| 2,880,230 | Edwards et al. | Mar. 31, 1959 |

FOREIGN PATENTS

| | | |
|---|---|---|
| 627,733 | Great Britain | Aug. 15, 1949 |